US009877466B2

(12) United States Patent
Rommelaere

(10) Patent No.: US 9,877,466 B2
(45) Date of Patent: Jan. 30, 2018

(54) FISH-SORTING SYSTEM FOR SORTING FISH IN A DRAGGED FISHING NET

(71) Applicant: KALAPA BVBA, Koksijde (BE)

(72) Inventor: Piet Rommelaere, Koksijde (BE)

(73) Assignee: KALAPA BVBA, Koksijde (BE)

( * ) Notice: Subject to any disclaimer, the term of this patent is extended or adjusted under 35 U.S.C. 154(b) by 109 days.

(21) Appl. No.: 14/209,912

(22) Filed: Mar. 13, 2014

(65) Prior Publication Data

US 2014/0259864 A1    Sep. 18, 2014

(30) Foreign Application Priority Data

Mar. 13, 2013  (BE) .................................. 2013/0161

(51) Int. Cl.
| | |
|---|---|
| A01K 73/02 | (2006.01) |
| A01K 73/00 | (2006.01) |
| A01K 73/10 | (2006.01) |
| A01K 75/00 | (2006.01) |
| A01K 61/90 | (2017.01) |

(52) U.S. Cl.
CPC .............. *A01K 73/02* (2013.01); *A01K 61/90* (2017.01); *A01K 73/00* (2013.01); *A01K 73/10* (2013.01); *A01K 75/00* (2013.01)

(58) Field of Classification Search
CPC ......... A01K 73/00; A01K 73/02; A01K 73/10
USPC ..................... 43/9.1, 9.3, 9.6, 17.1
See application file for complete search history.

(56) References Cited

U.S. PATENT DOCUMENTS

| | | | | |
|---|---|---|---|---|
| 2,765,565 A | * | 10/1956 | Mussio | 43/9.1 |
| 2,788,509 A | * | 4/1957 | Bolzmann | 367/113 |
| 2,948,980 A | * | 8/1960 | Worcester | 43/9.1 |
| 3,195,261 A | * | 7/1965 | Luketa | 43/9.3 |
| 3,297,980 A | * | 1/1967 | Haslett | 367/97 |
| 3,312,011 A | * | 4/1967 | Wathne et al. | 43/9.6 |
| 3,415,001 A | * | 12/1968 | Ott et al. | 43/17.1 |
| 3,482,034 A | * | 12/1969 | Rhoades et al. | 174/102 R |
| 3,483,649 A | * | 12/1969 | Hightower et al. | 43/9.6 |
| 3,491,474 A | * | 1/1970 | Metcalf, Jr. | 43/9.6 |

(Continued)

FOREIGN PATENT DOCUMENTS

| | | | |
|---|---|---|---|
| JP | 08105970 A | * | 4/1996 |
| JP | 2005278486 A | | 10/2005 |

(Continued)

OTHER PUBLICATIONS

Simrad ITI Trawl Monitoring System; Simrad; Oct. 2009; Rev. A.*
International Search Report dated Nov. 7, 2013.
European Search Report dated Jun. 24, 2014.

*Primary Examiner* — Joshua D Huson
*Assistant Examiner* — Michael A. Fabula
(74) *Attorney, Agent, or Firm* — Symbus Law Group, LLC; Clifford D. Hyra

(57) ABSTRACT

A fish-sorting system for sorting fish in a dragged fishing net (1), wherein the fish are actively sorted by means of a detection device (2, 3) which detects at least one size of a fish to be sorted; a processing unit which compares the size detected by the detection means (2, 3) with the desired size; and a sorting device (4) which retains fish in the fishing net (1) of a size greater than the desired size and which releases fish of a size smaller than the desired size from the fishing net (1) on the basis of the comparison between the detected size and the desired size carried out by the processing unit.

19 Claims, 2 Drawing Sheets

(56) References Cited

U.S. PATENT DOCUMENTS

| | | | | |
|---|---|---|---|---|
| 3,651,595 A * | 3/1972 | Newman | | 43/9.6 |
| 3,668,801 A * | 6/1972 | Metcalf, Jr. | | 43/17.1 |
| 4,043,068 A * | 8/1977 | Savoie | | 43/9.3 |
| 4,224,755 A * | 9/1980 | Bourret | | 43/9.1 |
| 4,402,154 A * | 9/1983 | Pence | | 43/9.2 |
| 4,417,301 A * | 11/1983 | Newman | | 363/129 |
| 4,538,249 A * | 8/1985 | Richard | | 367/94 |
| 4,739,574 A * | 4/1988 | Saunders | | 43/9.2 |
| 4,805,335 A * | 2/1989 | West et al. | | 43/9.2 |
| 4,869,010 A * | 9/1989 | Saunders, Sr. | | 43/9.2 |
| 4,963,035 A * | 10/1990 | McCarthy | | A22C 25/04 |
| | | | | 209/586 |
| 5,111,379 A * | 5/1992 | Sharber et al. | | 363/128 |
| 5,123,195 A * | 6/1992 | Hawkins | | 43/9.2 |
| 5,142,160 A * | 8/1992 | Storbeck | | A22C 17/0073 |
| | | | | 250/559.08 |
| 5,291,682 A * | 3/1994 | Zaccheo | | 43/17.1 |
| 5,644,863 A * | 7/1997 | Verburg | | 43/9.6 |
| 5,797,210 A * | 8/1998 | Verburg | | 43/9.6 |
| 6,138,397 A * | 10/2000 | Hammersland et al. | | 43/9.1 |
| 6,170,436 B1 * | 1/2001 | Goodson et al. | | 119/220 |
| 6,286,460 B1 * | 9/2001 | Gudbjornsson | | A01K 61/001 |
| | | | | 119/200 |
| 6,325,020 B1 * | 12/2001 | Guigne et al. | | 119/215 |
| 6,343,433 B1 * | 2/2002 | Granberg | | 43/6.5 |
| 2002/0080058 A1 * | 6/2002 | Suzuki | | G01S 7/062 |
| | | | | 342/22 |
| 2005/0226099 A1 * | 10/2005 | Satoh | | G01S 7/521 |
| | | | | 367/99 |
| 2007/0089349 A1 * | 4/2007 | Skjold-Larsen | | 43/9.1 |
| 2007/0165489 A1 * | 7/2007 | Inouchi | | H04B 11/00 |
| | | | | 367/131 |
| 2008/0137104 A1 * | 6/2008 | Lillerud | | A01K 61/001 |
| | | | | 356/627 |
| 2009/0282723 A1 * | 11/2009 | Hu et al. | | 43/9.7 |
| 2010/0293831 A1 * | 11/2010 | Hreinsson | | A01K 79/02 |
| | | | | 43/4.5 |
| 2014/0230308 A1 * | 8/2014 | Skjold-Larsen | | A01K 73/02 |
| | | | | 43/4.5 |

FOREIGN PATENT DOCUMENTS

| | | |
|---|---|---|
| WO | WO2008056988 A1 | 5/2008 |
| WO | WO2013042075 A2 | 3/2013 |

\* cited by examiner

FISH-SORTING SYSTEM FOR SORTING FISH IN A DRAGGED FISHING NET

This application claims the benefit of Belgian patent application No. 2013/0161, filed Mar. 13, 2013, which is hereby incorporated by reference in its entirety.

FIELD OF THE INVENTION

The present invention relates to a fish-sorting system for sorting fish in a dragged fishing net for retaining fish in the fishing net of a size greater than a desired size and releasing fish of a size smaller than the desired size from the fishing net.

In this patent application, the term fish includes: fish and other vertebrate and invertebrate marine animals that can be caught with a trawl.

BACKGROUND

Such a dragged fishing net is usually dragged by a vessel, such as for example a fishing boat.

In order to protect the fish stocks and to fish as efficiently as possible, only fish of a minimum desired longitudinal dimension and/or only fish of a certain species should be caught.

Until now, in so far as size is concerned, this has been achieved by means of modified constructions of the fishing net and fishing gear. These modified constructions ensure that fish of incorrect size can escape from the fishing net. Examples thereof are:
  providing a fishing net of a certain mesh width size, so that smaller fish can escape;
  providing panels containing larger square meshes in the fishing net, thus allowing fish species which tend to swim towards the surface to escape.

However, these systems are not able to sort the fish in a completely reliable manner, as a smaller fish may not be able to swim through the mesh of the net due to, for example, fatigue and/or may become stuck between other bigger fish. After a certain fishing period, the fishing net is raised and brought on board of the fishing boat. On board, the non-commercial fish are sorted from the caught fish and optionally thrown overboard. Fish which have been thrown overboard may or may not survive and continue to grow.

SUMMARY

It is an object of the present invention to further improve the capture selectivity of such a fishing net so that only commercial fish and/or legally permitted fish are caught and the fish which are not to be caught have the best chance of survival by not being brought on board.

This object of the invention is achieved by providing a fish-sorting system for sorting fish in a dragged fishing net for retaining fish in the fishing net of a size greater than a desired size and releasing fish of a size smaller than the desired size from the fishing net, wherein said fish-sorting system comprises
  a detection device for detecting at least one size of a fish to be sorted in the fishing net;
  a processing unit for comparing the size detected by the detection device to the desired size;
  a sorting device for retaining fish in the fishing net of a size greater than the desired size and for releasing fish of a size smaller than the desired size from the fishing net on the basis of the comparison between the detected size and the desired size carried out by the processing unit.

Due to such a fish-sorting system according to the present invention, fish are no longer sorted in a passive manner as was the case in the prior art, but fish are now sorted in an active way. By sorting the fish in an active way, the risk of catching undesired fish is greatly reduced and can be virtually eliminated. Only the commercial and/or legally allowed fish are caught and fish which are not be the caught are given the best chance of survival by not being brought on board. Furthermore, by not bringing fish which is not to be caught on board, the work on board is optimized due to the fact that this fish which is not to be caught no longer has to be sorted.

Preferably, a fish-sorting system according to the present invention also comprises a communication device for communicating the size detected by the detection device to the processing unit and/or a communication device for communicating the comparison made by the processing unit to the sorting device.

More specifically, the detection device of a fish-sorting system according to the present invention may comprise one or more distance sensors and comprise a time recorder for recording the time between measurements. By measuring the distance, it is possible to detect whether a fish is passing such a distance sensor. By measuring the time using the appropriate software, it is then possible to determine at least one size of such a fish (for example the length), if the speed at which the fish passes is known. Further on, it is discussed how this speed may be determined, for example, in a more specific embodiment with a second sensor, or in an alternative embodiment, with, for example, an ultrasound sensor with doppler technique. An ultrasound sensor may, for example, be selected as a distance sensor of this kind.

This type of sensor works satisfactorily in water with high turbidity, which in the North Sea is often the case. Such an ultrasound sensor may both transmit and receive an ultrasound wave. When this sensor transmits an ultrasound wave pulse, the same or a different sensor may receive the return signal when this wave pulse has reflected off a fish (the angle of incidence is the same as the exit angle). The time which is necessary to receive the transmitted signal is a measure of the distance between the sensor and the object. When the time between different measurements can be determined using said time recorder for recording the time between measurements, then the time during which the fish is detected is directly proportional to the corresponding size of the fish. In a simple embodiment, this size is the length of the fish. In a practical embodiment, the rate at which the fish passes will be required in order to calculate an appropriate length as well. Indeed, the fish may or may not swim more or less along with the flow in the net and therefore not always follows the net towing speed and the water flow in the net. The determination of the speed may, as given, and as further discussed in a specific embodiment, be done for example with the aid of a second sensor, such as discussed below with a specific embodiment, or in an alternative embodiment, with, for example, an ultrasound sensor with doppler technique.

Alternatively or additionally, the detection device may comprise one or more light sensors and comprise a time recorder for recording the time between measurements. Such light sensors can, for example, work on the basis of infrared light or on the basis of visible light. However, measurements on the basis of infrared light or on the basis of visible light can only be used in more or less clear water.

Still more specifically, the detection device of a fish-sorting system according to the present invention may comprise one or more cameras for capturing images of the fish to be sorted and comprise a time recorder for recording the time between the captured images. An infrared camera or a camera which works on the basis of visible light may, for example, be chosen as the camera. The required information can then be extracted from the successive images from different positions around the fishing net.

If the detection device comprise at least three sensors which are distributed over the periphery of the fishing net and are directed to the inside of the fishing net at different angles, it is possible to produce a three-dimensional image of a fish using these three sensors and the means for recording the time between different measurements and the appropriate software. From this image, it is then possible to determine, for example, the length, the width, the height, the shape and optionally the type of fish (e.g. round fish, flat fish) and the species of fish (e.g. cod, whiting, sole, plaice, etc.).

In a particularly preferred embodiment of a fish-sorting system according to the present invention, the fishing net comprises an end which, viewed in the direction of dragging of the fishing net, comes last, the detection means are arranged at a distance from this end and the sorting device guides fish which are of a size greater than the desired size towards this end.

The detection device of such an embodiment in this case preferably comprise a first sensor at a first distance from said end, a second sensor at a second distance from said end and a time recorder for recording the time between measurements at the first sensor and the second sensor.

From the difference in detection time, and the fixed distance between the detection of the two sensors, the swimming speed of the fish can be calculated, and its length in longitudinal direction can be determined.

Alternatively, the speed of the fish could also be calculated using an ultrasound sensor with doppler technique.

The ultrasonic sensor itself may also possibly be of the 'gated arrays' type.

The sorting device of a fish-sorting system according to the present invention preferably comprises a flap which is displaceable between a first position, in which it makes an opening in the fishing net freely accessible, through which fish can leave the fishing net, and a second position, in which it closes off said opening in the fishing net, and furthermore preferably comprises controls for controlling this flap depending on the comparison made by the processing unit between the detected size and the desired size.

In a particularly preferred embodiment of a fish-sorting system according to the present invention, the sorting device comprises a pulse generator for generating electrical pulses for startling fish.

Furthermore, a fish-sorting system preferably comprises one or more batteries for supplying power to the detection device and/or for supplying power to the processing unit and/or for supplying power to the sorting device.

Alternatively or additionally, a fish-sorting system according to the present invention may comprise one or more electrical power supply cables for supplying power to the detection device and/or for supplying power to the processing unit and/or for supplying power to the sorting device.

The object of the present invention is furthermore also achieved by providing a fishing net which comprises a fish-sorting system according to the present invention.

The present invention will now be explained in more detail by means of the following detailed description of a fishing net according to the present invention with a fish-sorting system according to the present invention. The aim of this description is solely to give illustrative examples and to indicate further advantages and particulars of this fishing net and this fish-sorting system, and can therefore not be interpreted as a limitation of the area of application of the invention or of the patent rights defined in the claims.

BRIEF DESCRIPTION OF THE DRAWINGS

In this detailed description, reference numerals are used to refer to the attached drawings, in which.

Figure 1:
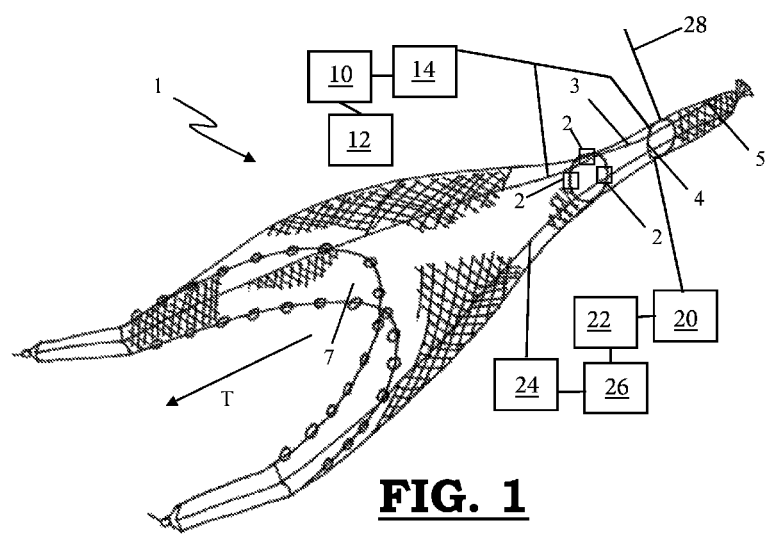
FIG. 1 shows a perspective view of an embodiment of a fishing net according to the present invention.

The illustrated fishing nets (1) according to the present invention are designed to be dragged by a vessel, such as for example a fishing boat. The direction (T) in which such a fishing net (1) is dragged is indicated in FIG. 1. When dragging the fishing net (1), fish enter the net (1) via the entrance opening (7) which is situated closest to the vessel according to the travelling direction (T) of the fishing net (1) and are carried along. The closed end (5) of the fishing net (1) is situated furthest from the vessel.

DETAILED DESCRIPTION OF EMBODIMENTS

According to the present invention, these fishing nets (1) comprise a fish-sorting system according to the present invention. In the illustrated embodiments, this fish-sorting system comprises several sensors (2, 3).

In this specific embodiment, three ultrasound sensors (2) are distributed along the periphery of the fishing net (1) arranged at a first distance of the closed end (5) of this fishing net (1). These sensors (2) are directed towards the inside of the fishing net (1) and are arranged such that they can carry out measurements at different angles (for example at every 120°).

If no object passes, the appropriate software which forms part of a processing unit (not shown), which, for example, comprises a processor, can calculate the distances between the different ultrasound sensors (2) and thus determine the geometry of the periphery of the fishing net (1) at the location of these sensors (2). To this end, the measured values of the different sensors (2) are passed onto the processing unit by means of a communication device. Depending on the dragging speed, the fishing net (1) is open to a greater or lesser degree. The distance between the sensors (2) is a measure of the degree to which the net (1) is open. When the geometry of the periphery of the fishing net (1) at the location of these sensors (2) is known, a three-dimensional reconstruction of the objects passing through is possible.

After this geometry has been determined, the length and optionally the width and thickness of each fish or each object which passes in front of these sensors (2) is scanned by these sensors (2). In this way, an image with the longitudinal dimension and optionally a three-dimensional image of the fish or of the object can be formed. By means of the appropriate software which forms part of the processing unit (not shown) and which combines distance and time, a three-dimensional image of the fish can be produced. Furthermore, it is also possible, if desired, to determine the type of fish (e.g. round fish, flat fish) and species of fish (e.g. cod, whiting, sole, plaice, etc.).

At a second distance from the end of the fishing net (1) (and therefore at a distance from said ultrasound sensors (2)), a reference sensor (3) is arranged. This reference sensor (3) serves to determine the speed of a fish or object which passes through the fishing net (1) between the former ultrasound sensors (2) and past this reference sensor (3). By calculating the time difference between detection of the fish or the object by the former sensors (2) and the reference sensor (3), the speed of this fish or this object is determined and thus the final size reference of this fish or this object. To this end, measured values are sent from this reference sensor (3) to the processing unit which performs these calculations.

Figure 2:
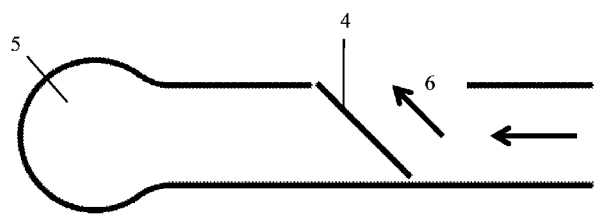
FIG. 2 diagrammatically shows an embodiment of a fishing net according to the present invention in cross section, in which the sorting device comprises a flap and in which this flap is situated in its first position.
Figure 3:
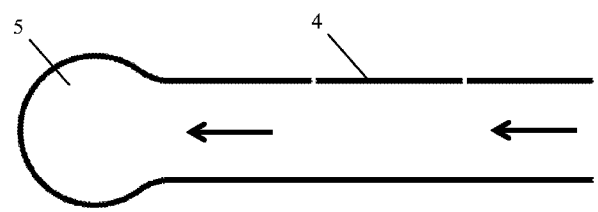
FIG. 3 diagrammatically shows the fishing net from FIG. 2 in cross section with its flap in its second position.

A sorting device (4) of the fish-sorting system is fitted between said sensors (2, 3) and the end (5) of the fishing net (1). In the illustrated specific embodiment, this sorting device (4) comprises a flap (4) and controls for moving the flap (4) between a first position, as illustrated in FIG. 2, in which the flap (4) gives free access to an opening (6) in the fishing net (1), and a second position, as illustrated in FIG. 3, in which the flap (4) closes off this opening (6). In the first position of the flap (4), fish and objects can leave the fishing net (1) through this opening (6). In the second position of the flap (4), fish are guided towards the closed end of the fishing net (1).

Said processing unit which determines one or more sizes of each object and each fish and optionally the type of fish will compare these one or more sizes and optionally this type of fish to one or more desired sizes and optionally a desired type of fish. This comparison is then passed on to the controls for controlling the flap (4) by means of a communication device. If the one or more sizes are greater than the desired one or more sizes and if, in addition, the type of fish corresponds to the desired type of fish, the flap (4) is brought to its second position, so that these fish are guided to the closed end (5) of the fishing net (1). However, if the one or more sizes are smaller than the desired one or more sizes and/or if the type of fish does not correspond to the desired type of fish, the flap (4) is brought to its first position, so that the undesired object or the undesired fish is guided out of the fishing net (1) through the opening (6).

In addition to the flap (4) or as an alternative to the flap (4), the sorting device (4) of a fish-sorting system according to the present invention may also comprise a pulse generator for generating electrical pulses for startling fish. Such a pulse generator is used to generate electrical pulses of a certain frequency and voltage to startle fish. The desired fish is thus, for example, startled so that it can be guided to the closed end (5) of the fishing net (1). The undesired fish and objects can then be guided out of the fishing net (1), for example without being startled.

In order to supply the sensors (2, 3) and/or the processing unit and/or the control means of the flap (4) and/or the pulse generator for generating electrical pulses with power, the fish-sorting system may, for example, comprise batteries which are arranged on the fishing net (1) or are supplied with power, for example, by means of an electrical cable from the vessel. If an electrical cable is used, other information (e.g. position, temperature, size of catch, salt content) can also be sent to the vessel via this cable for example. It is also possible to transmit the image from the sensors (2, 3), which may be desired for information purposes. If desired, a feedback line may be provided from the vessel to the sorting device in order to actively intervene from the vessel on this sorting device on the basis of the image received by, for example, nevertheless opening the flap (4) in order to release a fish which is desirable on the basis of the measurements, but which is undesirable for other reasons.

Figure 4:
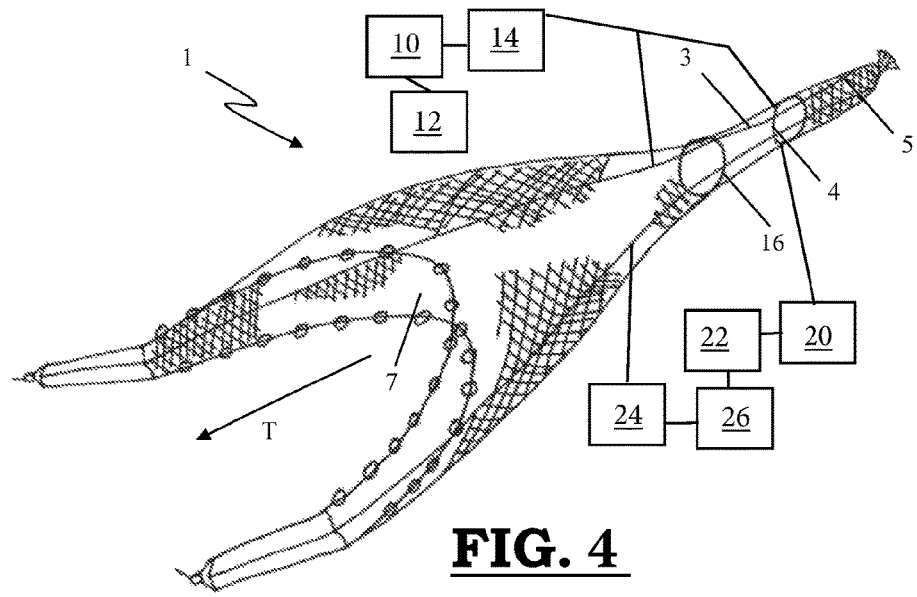
FIG. 4 shows a perspective view of an embodiment of a fishing net according to the present invention with light sensors.
Figure 5:
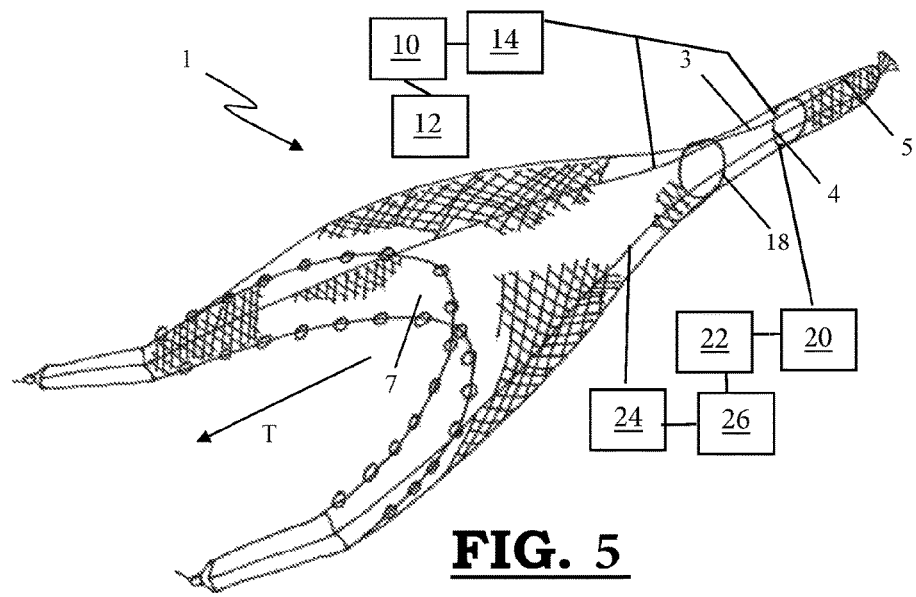
FIG. 5 shows a perspective view of an embodiment of a fishing net according to the present invention with infrared cameras.

Also shown schematically in FIG. 1 are feedback line (28), processing unit (10), in electronic communication with a communication device (12), in electronic communication with a time recorder (14), flap controls (20) connected to actuate the movement of the flap (4) described herein, and pulse generator (22), batteries (24), and electrical power supply cables (26) also in electrical communication with the foregoing components, as are the ultrasound sensors (2) and the reference sensor (3). FIG. 4 corresponds to FIG. 1, except that the ultrasound sensors (2) are replaced by the light sensors (16) described herein. Likewise, FIG. 5 corresponds to FIG. 1, except that the ultrasound sensors (2) are replaced by the infrared cameras (18) described herein.

The invention claimed is:

1. A fish-sorting system for sorting fish in a dragged fishing net for retaining fish in the fishing net of a size greater than a desired size and releasing fish of a size smaller than the desired size from the fishing net, wherein said fish-sorting system comprises:
   a detection device configured to detect at least one size of a fish to be sorted in the fishing net;
   a processing unit programmed to compare the size detected by the detection means to the desired size; and
   a sorting device for retaining fish in the fishing net of a size greater than the desired size and for releasing fish of a size smaller than the desired size from the fishing net on the basis of the comparison between the detected size and the desired size carried out by the processing unit;
wherein the detection device comprises:
   wherein the fishing net comprises an end which, viewed in the direction of dragging of the fishing net, comes last;
   a plurality of distance sensors distributed around a periphery of the fishing net that obtain distance measurements from different angles, wherein the distance sensors are at a first distance from said end;
   a reference sensor configured to detect passing fish, wherein the reference sensor is at a second distance from said end; and
   a time recorder for recording the time between the fish being measured by the distance sensors and being detected by the reference sensor;
   wherein the detection device determines a speed at which the fish is swimming using the recorded time, and considers the speed at which the fish is swimming in the detecting the at least one size of the fish to be sorted in the fishing net;
   wherein the processing unit is programmed to determine a geometry of the periphery of the fishing net at the first distance from said end, using measured values of the distance sensors when no object is passing between the distance sensors, and based on the determined geometry, to produce three-dimensional images of objects passing the distance sensors.

2. The fish-sorting system according to claim 1, wherein said fish-sorting system comprises a communication device configured to communicate the size detected by the detection device to the processing unit.

3. The fish-sorting system according to claim 1, wherein said fish-sorting system comprises a communication device configured to communicate the comparison made by the processing unit to the sorting device.

4. The fish-sorting system according to claim 1, wherein the distance sensors comprise at least one ultrasound sensor.

5. The fish-sorting system according to claim 1, wherein the sorting device guides fish which are of a size greater than the desired size towards said end.

6. The fish-sorting system according to claim 5, wherein the distance sensors are upstream of the reference sensor.

7. The fish-sorting system according to claim 1, characterized in that the sorting device comprises a flap which is displaceable between a first position, in which it makes an opening in the fishing net freely accessible, through which fish can leave the fishing net, and a second position, in which it closes off said opening in the fishing net,
wherein the sorting device comprises controls for controlling the flap depending on the comparison made by the processing unit between the detected size and the desired size.

8. The fish-sorting system according to claim 7, further comprising one or more electrical power supply cables for supplying power to the detection device and/or for supplying power to the processing unit and/or for supplying power to the sorting device.

9. The fish-sorting system according to claim 8, wherein the one or more electrical power supply cables are connected to a vessel that drags the fishing net and are configured to send information to the vessel.

10. The fish-sorting system according to claim 9, further comprising a feedback line from the vessel to the sorting device, wherein the information comprises images of fish passing the distance sensors, wherein the feedback line is configured to manually override the processing unit in operating the flap.

11. The fish-sorting system according to claim 1, wherein the sorting device comprises a pulse generator for generating electrical pulses for startling fish.

12. The fish-sorting system according to claim 1, further comprising one or more batteries for supplying power to the detection device and/or for supplying power to the processing unit and/or for supplying power to the sorting device.

13. The fish-sorting system according to claim 1, wherein the processing unit is further programmed to determine a type of fish and/or species of fish passing by the distance sensors, based on the three-dimensional images.

14. The fish-sorting system according to claim 13, wherein the processing unit is programmed to cause the sorting device to release fish in the fishing net of a size greater than the desired size but not of a desired type.

15. The fish-sorting system according to claim 1, wherein the processing unit is programmed to determine the geometry after a change in dragging speed and therefore openness of the fishing net.

16. A fishing net, comprising:
a fish-sorting system according to claim 1.

17. A fish-sorting system for sorting fish in a dragged fishing net for retaining fish in the fishing net of a size greater than a desired size and releasing fish of a size smaller than the desired size from the fishing net, wherein said fish-sorting system comprises:

a detection device configured to detect at least one size of a fish to be sorted in the fishing net;
a processing unit programmed to compare the size detected by the detection means to the desired size; and
a sorting device for retaining fish in the fishing net of a size greater than the desired size and for releasing fish of a size smaller than the desired size from the fishing net on the basis of the comparison between the detected size and the desired size carried out by the processing unit;
wherein the detection device comprises:
sensors, including one or more light sensors, for detecting fish swimming by, comprising first sensors distributed around a periphery of the fishing net and a second reference sensor spatially separated from the first sensors along a direction of dragging of the fishing net; and
a time recorder for recording the time between detections at first and second sensors;
wherein the device determines a speed at which the fish is swimming based on the recorded time and considers the speed at which the fish is swimming in the detecting the at least one size of the fish to be sorted in the fishing net;
wherein the processing unit is programmed to determine a geometry of the periphery of the fishing net at a location of the first sensors, using measured values of the first sensors when no object is passing between the first sensors and, based on the determined geometry, to produce three-dimensional images of objects passing the first sensors.

18. A fish-sorting system for sorting fish in a dragged fishing net for retaining fish in the fishing net of a size greater than a desired size and releasing fish of a size smaller than the desired size from the fishing net, wherein said fish-sorting system comprises:
a detection device configured to detect at least one size of a fish to be sorted in the fishing net;
a processing unit programmed to compare the size detected by the detection means to the desired size; and
a sorting device for retaining fish in the fishing net of a size greater than the desired size and for releasing fish of a size smaller than the desired size from the fishing net on the basis of the comparison between the detected size and the desired size carried out by the processing unit;
wherein the detection device comprises:
sensors, including one or more cameras, for capturing images of the fish to be sorted, comprising first sensors distributed around a periphery of the fishing net and a second reference sensor spatially separated from the first sensors along a direction of dragging of the fishing net; and
a time recorder for recording the time between the captured images at first and second sensors;
and wherein the device determines a speed at which the fish is swimming based on the recorded time and considers the speed at which the fish is swimming in the detecting the at least one size of the fish to be sorted in the fishing net;
wherein the processing unit is programmed to determine a geometry of the periphery of the fishing net at a location of the first sensors, using measured values of the first sensors when no object is passing between the first sensors and, based on the determined geometry, to produce three-dimensional images of objects passing the first sensors.

19. The fish-sorting system according to claim 18, wherein the one or more cameras comprise at least one infrared camera.

\* \* \* \* \*